(12) United States Patent
Banerjee et al.

(10) Patent No.: US 7,290,549 B2
(45) Date of Patent: Nov. 6, 2007

(54) CHEMICAL HEAT SOURCE FOR USE IN SMOKING ARTICLES

(75) Inventors: Chandra Kumar Banerjee, Clemmons, NC (US); Sheila Lynnette Cash, Greensboro, NC (US); Thomas Leeroy Gentry, Hickory, NC (US); Joanne Naomi Taylor, Germanton, NC (US); Patty Ferguson Turner, Winston-Salem, NC (US)

(73) Assignee: R. J. Reynolds Tobacco Company, Winston-Salem, NC (US)

( * ) Notice: Subject to any disclaimer, the term of this patent is extended or adjusted under 35 U.S.C. 154(b) by 654 days.

(21) Appl. No.: 10/625,762

(22) Filed: Jul. 22, 2003

(65) Prior Publication Data

US 2005/0016549 A1    Jan. 27, 2005

(51) Int. Cl.
  *A24F 1/22* (2006.01)
(52) U.S. Cl. .................................... 131/194
(58) Field of Classification Search ............ 131/194, 131/361
  See application file for complete search history.

(56) References Cited

U.S. PATENT DOCUMENTS

| | | |
|---|---|---|
| 2,104,266 A | 1/1938 | McCormick |
| 3,258,015 A | 6/1966 | Ellis et al. |
| 3,623,471 A | 11/1971 | Bogue |
| 3,683,936 A | 8/1972 | O'Neil, Jr. |
| 3,766,079 A | 10/1973 | Jackman et al. |
| 3,774,589 A | 11/1973 | Kober |
| 3,851,654 A | 12/1974 | Kober |
| 3,871,357 A | 3/1975 | Grosso et al. |
| 3,878,118 A | 4/1975 | Watson |
| 3,884,216 A | 5/1975 | McCartney |
| 3,906,926 A | 9/1975 | Staples |
| 3,920,476 A | 11/1975 | Black et al. |
| 3,942,511 A | 3/1976 | Black et al. |
| 3,993,577 A | 11/1976 | Black et al. |
| 4,017,414 A | 4/1977 | Black et al. |
| 4,079,742 A | 3/1978 | Rainer et al. |
| 4,080,953 A | 3/1978 | Mitchell et al. |
| 4,094,298 A | 6/1978 | Kober |
| 4,095,583 A | 6/1978 | Petersen et al. |

(Continued)

OTHER PUBLICATIONS

US 5,119,837, 06/1992, Banerjee et al. (withdrawn)

*Primary Examiner*—Dionne W. Mayes
(74) *Attorney, Agent, or Firm*—Brinks Hofer Gilson & Lione

(57) ABSTRACT

A non-combustion, chemical heat source includes a heat chamber having a closed end and an open end. The heat chamber includes an apertured heat cartridge disposed at the open end of the chamber, an abutment disposed at the closed end of the chamber, an activating solution, a frangible seal separating the activating solution and the heat cartridge. The heat cartridge includes metallic agents that may come in a variety of configurations. The heat source is activated when the heat cartridge is pushed through and breaks the frangible seal allowing contact between the metallic agents and the activating solution. The heat cartridge includes an aperture in the bottom of the cartridge and absorbent paper surrounding the metallic agents, both of which control the transfer of the activating solution into the metallic agents to cause the chemical reaction. The heat sources may be incorporated into smoking articles and may also be used to heat foods or beverages, in hand warmers, and to heat equipment or materials.

39 Claims, 5 Drawing Sheets

U.S. PATENT DOCUMENTS

| | | |
|---|---|---|
| 4,098,258 A | 7/1978 | Kober |
| 4,142,508 A | 3/1979 | Watson |
| 4,149,548 A | 4/1979 | Bradshaw |
| 4,186,746 A | 2/1980 | Byler |
| 4,223,661 A | 9/1980 | Sergev et al. |
| 4,264,362 A | 4/1981 | Sergev et al. |
| 4,284,089 A | 8/1981 | Ray |
| 4,338,098 A | 7/1982 | Yamaji |
| 4,393,884 A | 7/1983 | Jacobs |
| 4,708,151 A | 11/1987 | Shelar |
| 4,714,082 A | 12/1987 | Banerjee et al. |
| 4,756,318 A | 7/1988 | Clearman et al. |
| 4,774,971 A | 10/1988 | Vieten |
| 4,776,353 A | 10/1988 | Lilja et al. |
| 4,793,365 A | 12/1988 | Sensabaugh, Jr. et al. |
| 4,807,809 A | 2/1989 | Pryor et al. |
| 4,848,374 A | 7/1989 | Chard et al. |
| 4,917,119 A | 4/1990 | Potter et al. |
| 4,938,236 A | 7/1990 | Banerjee et al. |
| 4,955,399 A | 9/1990 | Potter et al. |
| 5,040,552 A | 8/1991 | Schleich et al. |
| 5,146,934 A | 9/1992 | Deevi et al. |
| 5,188,130 A | 2/1993 | Hajaligol et al. |
| 5,220,930 A | 6/1993 | Gentry |
| 5,247,949 A | 9/1993 | Deevi et al. |
| 5,285,798 A | 2/1994 | Banerjee et al. |
| 5,357,984 A | 10/1994 | Farrier et al. |
| 5,360,023 A | 11/1994 | Blakley et al. |
| 5,443,560 A | 8/1995 | Deevi et al. |
| 5,538,020 A | 7/1996 | Farrier et al. |
| 5,593,792 A | 1/1997 | Farrier et al. |
| 5,598,868 A | 2/1997 | Jakob et al. |
| 6,513,524 B1 | 2/2003 | Storz |
| 6,598,607 B2 | 7/2003 | Adfiga et al. |

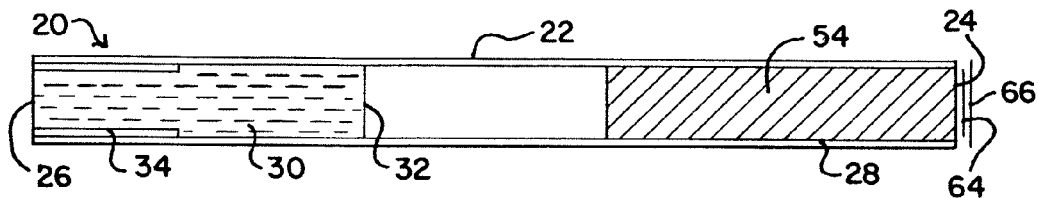
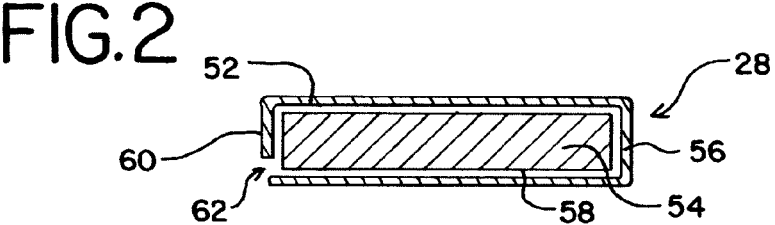
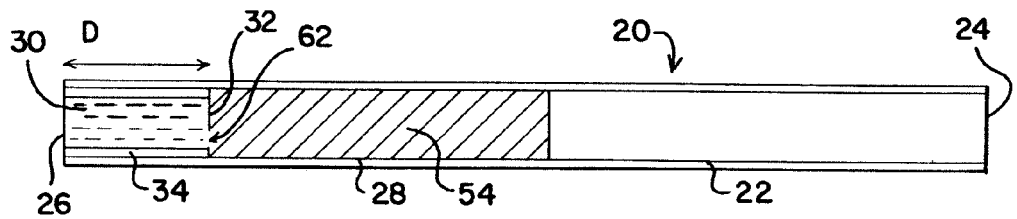
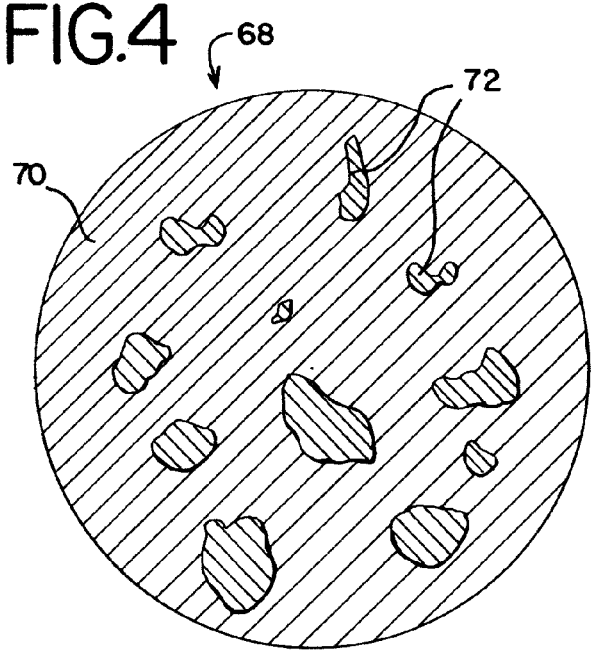
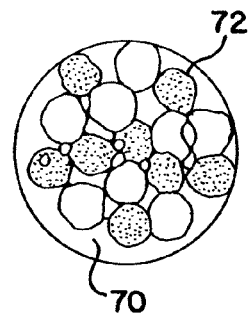

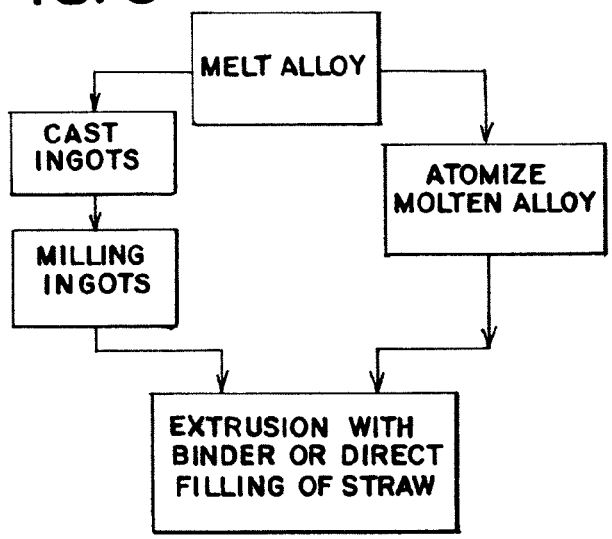
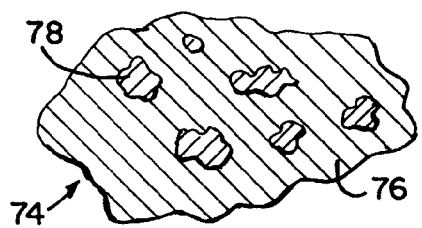
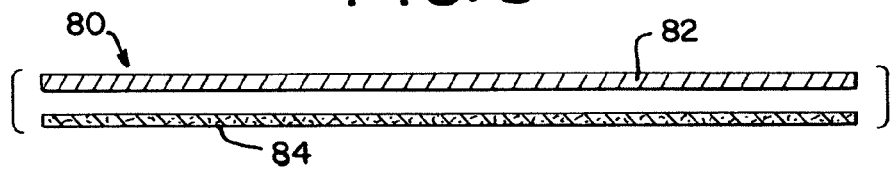
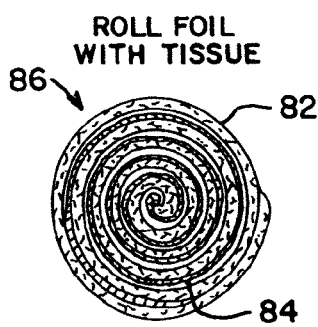
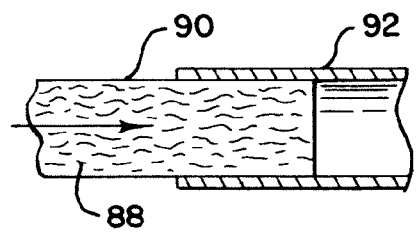
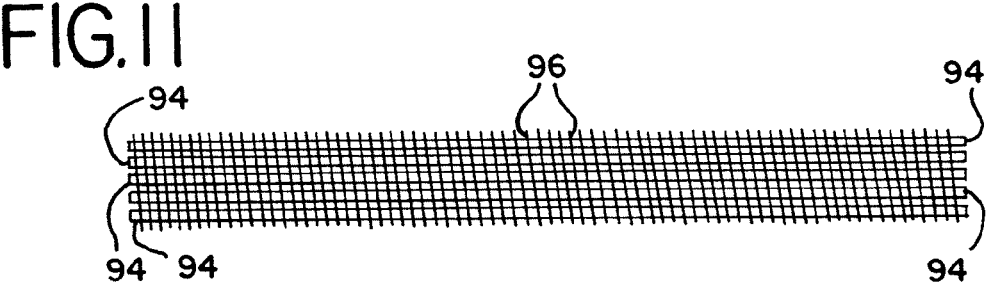

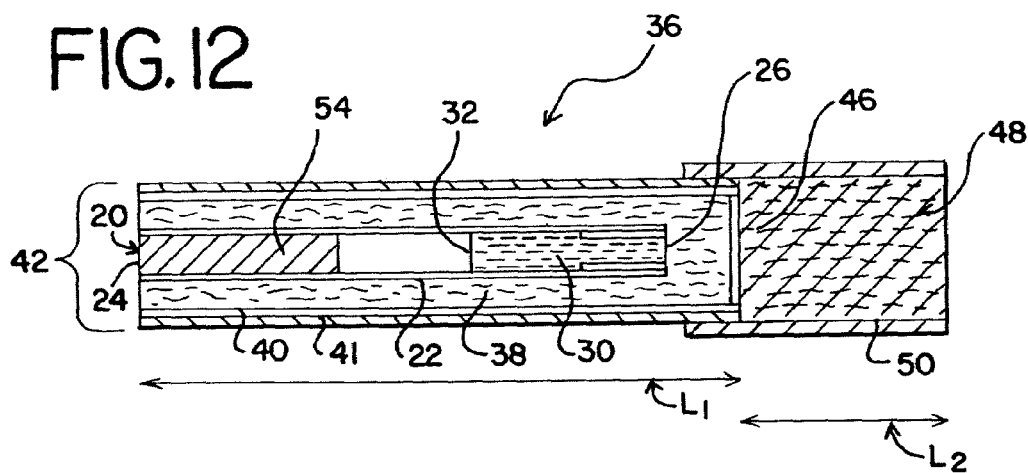
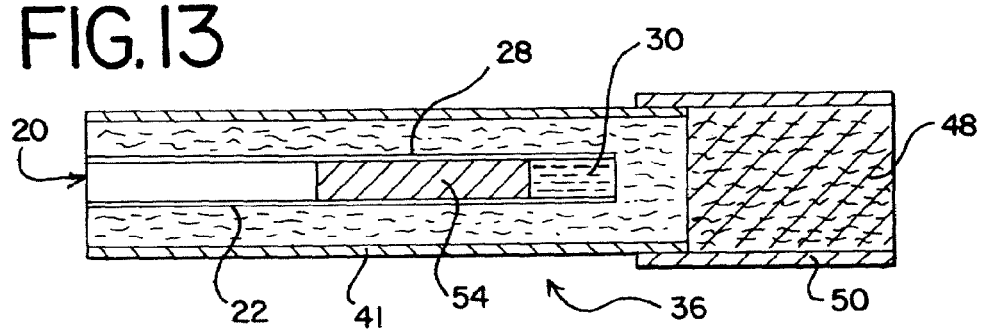
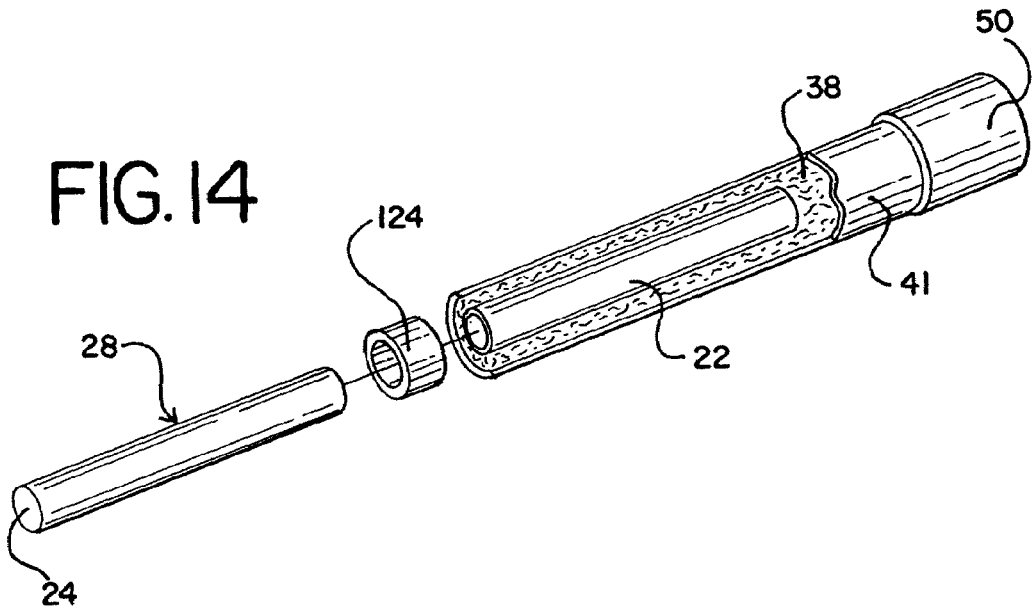

CHEMICAL HEAT SOURCE FOR USE IN SMOKING ARTICLES

BACKGROUND OF THE INVENTION

The present invention relates to non-combustion chemical heat sources, such as electrochemical heat sources, materials used to make chemical heat sources, and methods of forming chemical heat sources. Specifically, the present invention relates to a heat source used in a smoking article to heat tobacco, thereby producing a tobacco flavor or tobacco-flavored aerosol.

The heat sources of the present invention are particularly adapted for use in smoking articles that are capable of providing the user with the pleasures of smoking (e.g., smoking taste, feel, satisfaction, and the like), without burning tobacco or any other material, without producing sidestream smoke or odor, and without producing combustion products such as carbon monoxide. As used herein, the term "smoking article" includes cigarettes, cigars, pipes, and the like, which use tobacco in various forms.

Smoking articles have had various shapes, and have been composed of various types of components. Examples of smoking articles or cigarettes with electrochemical heat sources are described in U.S. Pat. No. 4,938,236 to Banerjee et al.; U.S. Pat. No. 4,955,399 to Potter et al.; U.S. Pat. No. 5,285,798 to Banerjee et al.; U.S. Pat. No. 5,357,984 to Farrier et al.; U.S. Pat. No. 5,538,020 to Farrier et al.; and U.S. Pat. No. 5,593,792 to Farrier et al., which are all incorporated herein by reference. Banerjee et al. ('798) describes one embodiment of a cigarette with a heat source that included a heat chamber, a metallic electrochemical agent, and an activating solution separated from the electrochemical agent by a frangible seal. The electrochemical agent was pushed through the seal into the activating solution to begin the electrochemical reaction to generate modest amounts of heat. The use of this heat source was limited because it created an uncontrolled reaction and could sustain temperatures of about 100° C. in temperature.

Although much work has been done in this field, it would be desirable to produce an improved heat source that can attain, maintain, and sustain, higher than 100° C. temperatures and can be used to construct a smoking article that can provide many of the pleasures of cigarette or pipe smoking, but does not burn tobacco or other material, and which does not produce any combustion products.

It would also be desirable to develop an improved non-combustion, chemical heat source that can be used for other uses. For example, U.S. Pat. No. 3,623,471 to Bogue discloses a short circuited battery of a flexible shape that acts as a heater and suggests that it may be used to heat a can of soup, c-rations, and building materials. U.S. Pat. Nos. 3,774,589 and 3,851,654 to Kober disclose an electrochemical heat source and suggest that the heat produced thereby can be used for heating hair for waving, a hot compress, and heating food.

Additional patents disclosing electrochemical or exothermic chemical reactions and some of the uses described thereof include: U.S. Pat. No. 3,766,079 (heating a resin used to seal joints in pipeline); U.S. Pat. No. 3,871,357 (heating precooked food); U.S. Pat. No. 3,878,118 (heating cosmetic compositions); U.S. Pat. No. 3,884,216 (heating diver's suit); U.S. Pat. No. 3,906,926 (curing underwater adhesives); U.S. Pat. Nos. 3,920,476; 3,942,511; 3,993,577 and 4,017,414 (heating diver's suit, machinery and equipment); U.S. Pat. No. 4,080,953 (heating blanket); U.S. Pat. No. 4,094,298 (heating prepackaged food); U.S. Pat. No. 4,095,583 (hand warming pads); U.S. Pat. No. 4,098,258 (heating beef stew and other precooked foods); U.S. Pat. No. 4,142,508 (heating electrical insulator to shrink it over a wire splice); U.S. Pat. No. 4,186,746 (body warmer); U.S. Pat. Nos. 4,223,661 and 4,264,362 (heating diver's suit and melting ice); U.S. Pat. No. 4,338,098 (heating frozen foods and controlled release agricultural chemicals).

BRIEF SUMMARY OF THE INVENTION

In one aspect, the invention is a heat source including a heat chamber having a closed end and an open end. The heat chamber includes an apertured heat cartridge disposed at the open end of the chamber, an abutment disposed at the closed end of the chamber, an activating solution, and a frangible seal separating the activating solution and the heat cartridge. The heat cartridge of the present invention includes exothermic chemical reactants, such as, but not limited to, metallic agents, that may come in a variety of configurations. Some of the configurations include frozen melts (collodalloys), mechanical alloys, and bimetallic foils and wires.

The heat source is activated when the heat cartridge is pushed through and breaks the frangible seal allowing contact between the metallic agents and the activating solution. The heat cartridge includes an aperture in the bottom of the cartridge and absorbent paper surrounding the metallic agents, both of which control the transfer of the activating solution into the metallic agents causing the chemical reaction. The heat cartridge may include any components that can undergo a non-combustion reaction to generate heat, wherein the preferred reaction is a liquid-solid electrochemical reaction. The heat cartridge is sized relative to the heat chamber such that upon activation, the metallic agents expand the heat cartridge tight against the heat chamber allowing pressure to build up and drive more activating solution into the heat cartridge, thereby generating more heat.

When used in a smoking article, preferred heat sources generate relatively large amounts of heat to rapidly heat at least a portion of the tobacco in the smoking article to a temperature sufficient to volatilize flavorful components from the tobacco. For example, preferred smoking articles employ a heat source capable of heating at least a portion of the tobacco to above 100° C. within about 30 seconds from the time that the heat source is activated. Preferred smoking articles employ heat sources which avoid excessive heating of the tobacco and maintain the tobacco within a desired temperature range, between about 4 minutes and about 8 minutes or longer. For the preferred smoking articles, the heat source thereof heats the tobacco contained therein to a temperature range between about 70° C. and about 250° C., more preferably between about 85° C. and about 180° C., during the useful life of the smoking article.

To use the smoking article constructed with a heat source of the invention, the smoker initiates the interactions between the components of the heat source, and heat is generated. The interaction of the components of the heat source provides sufficient heat to heat the tobacco which is physically separate from the heat source. Tobacco flavors and other flavoring substances are volatilized from the tobacco. When the smoker draws on the smoking article, the volatilized substances pass through the smoking article and into the mouth of the smoker. As such, the smoker is provided with many of the flavors and other pleasures associated with cigarette smoking without burning any materials.

The materials used in, and the methods of forming the heat sources and smoking articles of the present invention, are described in greater detail in the accompanying drawings and in the detailed description of the invention which follows.

BRIEF DESCRIPTION OF SEVERAL VIEWS OF THE DRAWINGS

FIG. 1 is a longitudinal, sectional view of a heat source of a first preferred embodiment of the present invention prior to activation;

FIG. 2 is a detailed sectional view of the heat cartridge of FIG. 1;

FIG. 3 is a longitudinal, sectional view of the heat source of FIG. 1 after activation;

FIG. 4 is a cross-sectional representation of one embodiment of metallic agents capable of interacting electrochemically with one another for use in the heat source of FIG. 1;

FIG. 5 is a schematic representation of an enlarged section of FIG. 4;

FIG. 6 is a block diagram showing methods of producing electrochemical agents for use in the heat source of FIG. 1;

FIG. 7 is a schematic representation of another embodiment of metallic agents capable of interacting electrochemically with one another;

FIGS. 8, 9, and 10 are schematic representations of other embodiments of the metallic agents in various stages of preparation for the heat source of FIG. 1;

FIG. 11 is a schematic representation of still another embodiment of the metallic agents for the heat source of FIG. 1;

FIG. 12 is a longitudinal, sectional view of a cigarette of another embodiment of the present invention prior to activation;

FIG. 13 is a longitudinal, sectional view of the cigarette of FIG. 12 after activation;

FIG. 14 is a cut-away, exploded perspective view of the cigarette of FIG. 12;

DETAILED DESCRIPTION OF THE PREFERRED EMBODIMENTS OF THE INVENTION

Figure 15:
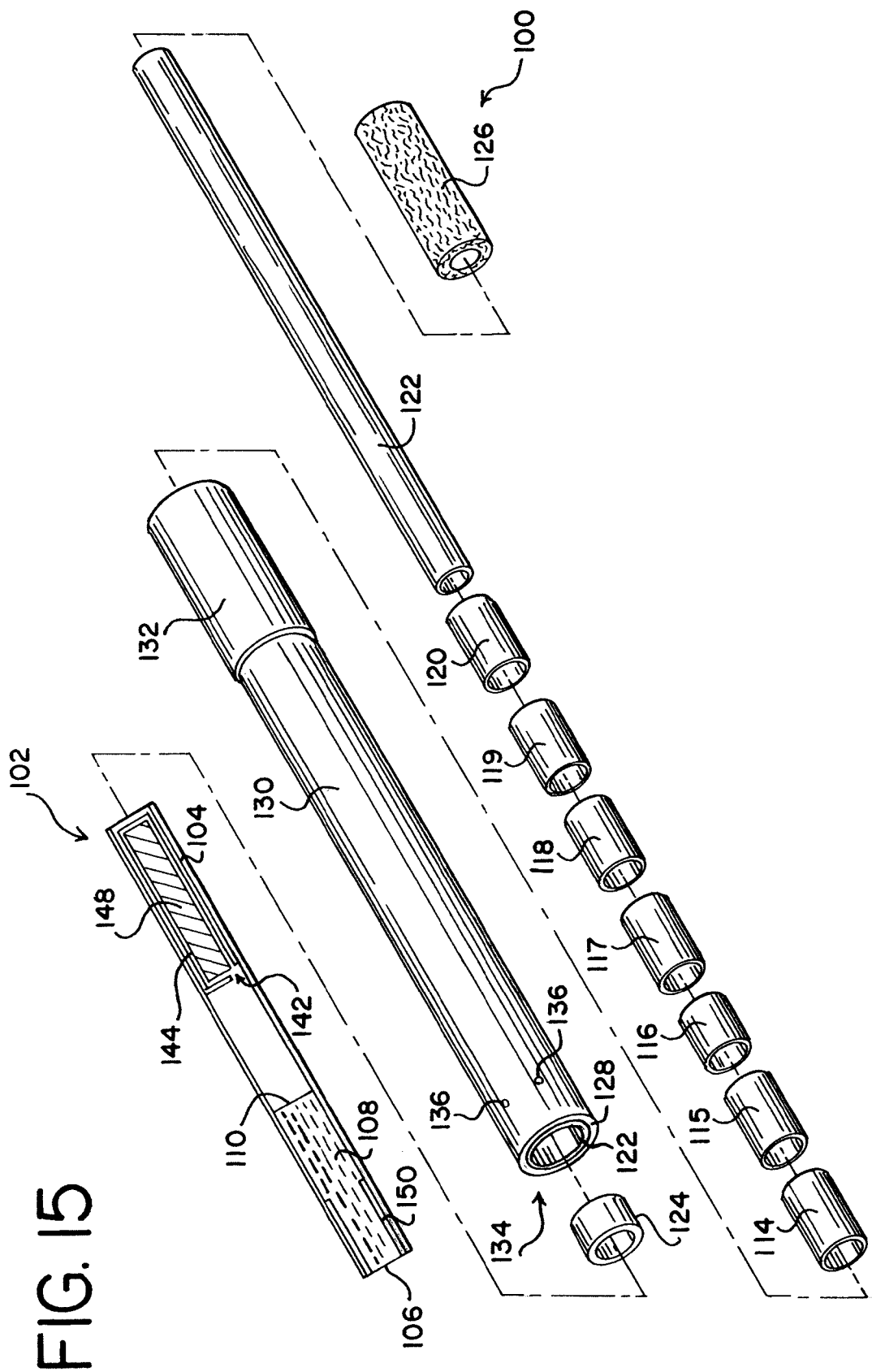
FIG. 15 is a perspective, exploded view of a cigarette using a preferred heat source of the present invention.

Unless specified otherwise, all percentages used herein are percentages by weight.

For the purposes of this application, the heat source will be referred to in combination with a cigarette. It will be recognized by those skilled in the art, that the heat source of the present invention may be used in a variety of embodiments. For the purposes of this application, preferred embodiments of the heat source will be described as utilizing an electrochemical reaction. It should be known to those skilled in the art that this non-combustion heat source and the present invention is not limited to utilizing electrochemical reactions, but may utilize any non-combustion, exothermic, chemical reaction.

Referring to FIG. 1, the chemical heat source 20 of the present embodiment desirably has an elongated, desirably cylindrical rod shape to match the shape of a cigarette in which it may be used. The heat source 20 includes a heat chamber 22, a heat cartridge 28, an activating solution 30, a frangible seal 32, and a stopper 34. Compared to prior heat sources, the heat source 20 of the present invention reaches higher temperatures and sustains those temperatures for longer periods of time without using combustible components.

Looking at the elements of the chemical heat source more specifically, the primary containment for the heat source 20 is the heat chamber 22. The heat chamber 22 has an open end 24, and a closed end 26. In the embodiment shown, a heat cartridge 28 is maintained within the heat chamber 22, toward the open end 24 of the heat chamber 22 by friction fit. A stopper 34 is disposed at the closed end 26 of the heat chamber 22, opposite the heat cartridge 28. A frangible seal 32 separates the heat cartridge 28 and a reservoir of activating solution 30 which is disposed toward the closed end 26 of the heat chamber 22.

Materials suitable for making the heat chamber 22 include, but are not limited to, polypropylene, polyethylene, polyethylene mixed with polypropylene, polyethylene terephthalate, kapton, Mylar®, or blended polymers. Desirably, the heat chamber 22 can be manufactured from a polymeric substance (e.g., polypropylene), a plastic material (e.g., Mylar®), or any material which is heat resistant up to the temperature generated by the heat source. More desirably, the heat chamber 22 is manufactured from a grade of polypropylene that can withstand temperatures in excess of 200° C. Preferably the heat chamber 22 is light weight, water impervious, and strong enough so that it does not rupture, even when wet and under light pressure. Even some coated papers that may meet some of the above characteristics may be used to construct the heat chamber 22. When the heat chamber 22 is manufactured from an electrically conductive material (e.g., aluminum), it is preferred that the inner wall of the heat chamber be composed of an electrically insulative material.

The stopper 34 is disposed at the closed end 26 of heat chamber 22. The stopper 34 provides an abutment surface to limit the travel of the heat cartridge 28. Upon activation of the heat source 20, the stopper 34 provides a reservoir of activating solution 30 to sustain the electrochemical reaction in the heat cartridge 28. The stopper means may include any kind of physical means, such as, but not limited to, a pin, rod, tube, cylinder, stent, cage, etc., that stops the movement of the heat cartridge before it reaches the closed end 26 of the heat chamber. Desirably, the stopper 34 is a 5 to 20 mm long tube, open at both ends, having the same diameter as the heat cartridge. It may be constructed of a nonabsorbent, non-conducting material. Examples of suitable stopper materials include, but are not limited to, polypropylene and Mylar®.

The stopper means is not limited to a separate physical element. Another embodiment of a stopper includes tapering the diameter of the heat chamber 22 toward the closed end 26, so that when the heat cartridge 28 is pushed toward the closed end 26, the tapered diameter of the chamber 22 will stop the movement of the heat cartridge 28. Likewise, a crimped or narrowed restriction in the chamber 22 may provide the same function.

The heat cartridge 28 is friction fit inside of the heat chamber 22 at the chamber's open end 24. Referring now to FIG. 2, an exemplary embodiment of the heat cartridge 28 includes a tube housing 52, with a sealed end 56, an apertured end 60, and metallic agents 54 wrapped in an absorbent tissue-like paper 58. A variety of materials may be used to form the housing tube 52 of the heat cartridge 28 so long as the activating solution 30 (discussed in more detail below) is able to permeate and react with the metallic agents 54 to form the exothermic reaction. Materials that may be used to form the tube housing 52 for the heat cartridge 28 include, but are not limited to, porous plug wrap commonly used in cigarettes, Hewlett Packard 75 g/m² printing paper (20 lb.), polyester polymer, and tissue paper. Preferably, the tube housing material is pliable and easy to roll to form a tube. The tube housing 52 is held in a roll using an adhesive. The adhesive is preferably one that will hold the heat cartridge 28 together and will allow for expansion upon reaction of the electrochemical agent in the cartridge 28.

The tube housing 52 is folded and sealed at one end 56. One embodiment of the heat source includes filling the tube housing 52 with at least two metallic agents 54 which can interact electrochemically. Non-electrochemical reagents may also be used in the heat source. One example of a non-electrochemical reaction would be the dissolution of calcium oxide, or lime, in water to produce heat. Before inserting the metallic agents 54 into the tube housing 52, the entire length of the metallic agents 54 is covered with a piece of tissue-like absorbent paper 58. The tissue-like paper 58 helps to convey the activating solution 30 (discussed below) into the inside of the heat cartridge 28 for use in the electrochemical interaction. The tissue-like paper 58 also helps hold the metallic agents 54 in the tube housing 52 and prevents the metallic agents 54 from immersing into the activating solution 30 until it is time for the reaction to begin. Materials that may be used for the tissue-like paper 58 include one-ply tissue-like material or extremely porous or thin paper that allows the activating solution to penetrate the metallic agents 54 at a fast rate. For example, Kleenex® tissues, Kimwipes® tissues, cotton balls, or highly porous cigarette paper may be used.

The metallic agents 54 may be processed in a variety of ways. The individual metallic agents 54 can be pure metals, metal alloys, or other metallic compounds. The metallic agents 54 that fill the heat cartridge 28 may be simply a mixture of metal powders. Each of the preferred heat cartridge 28 configurations of the present embodiment uses one of the metallic agents as an anode in an electrochemical interaction and another metallic agent as a cathode. For this to happen, the metallic agents 54 will preferably be in electrical contact with one another. Each of the configurations also uses an electrolyte or activating solution 30. In some embodiments, the electrical contact between the metallic agents could be through the electrolyte. A preferred anode material is magnesium, which reacts with water to form magnesium hydroxide ($Mg(OH)_2$) and hydrogen gas, and generates large amounts of heat. Other metallic agents having high standard oxidation potentials (such as lithium) may also serve as the anode material, but are less preferred from a cost and safety standpoint. The second metallic agent acts as a cathode to speed up the reaction of the anode material. The cathode may be any metallic agent having a lower standard oxidation potential than the anode material. The cathode is not consumed in the electrochemical interaction, but serves as a site for electrons given up by the corroding anode to neutralize positively charged ions in the electrolyte.

Some preferred metallic agents 54 for use in the heat cartridges of the present embodiment include copper, nickel, palladium, silver, gold, platinum, carbon, cobalt, aluminum, lithium, iron, iron(II)oxide, iron(III)oxide, magnesium, $Mg_2Ni$, $MgNi_2$, $Mg_2Ca$, $MgCa_2$, $MgCO_3$, and combinations thereof. For example, platinum may be dispersed on carbon and this dispersion used as a cathode material.

Desirable methods of preparing the metallic agents 54 for use in the heat cartridge 28 include forming a frozen melt (corrodalloy), a mechanical alloy, constructing a bimetallic foil, or electrically connected wires. With respect to mechanical alloys, frozen melts, and sometimes even with bimetallic foils, the mechanical agents generally are formed into small particles that are later compressed or extruded, or packed in a tube, to fill the heat cartridge.

A frozen melt 68 is shown schematically in FIG. 4. The melt 68 is prepared by heating the metallic agents until both are melted, and then cooling the melt until it is solid. With some metallic agents, the frozen melt will constitute a multiphase alloy, such as when two metallic agents are not very soluble in one another. Also, in preferred frozen melts, one metallic agent is provided in a concentration such that it precipitates as large crystalline grains 70 in the matrix of smaller eutectic solids 72. FIG. 5 shows an enlarged section of the eutectic matrix depicting crystallites 70 and 72 of the individual metallic agents. In preferred embodiments, the grains 70 will be more predominant than shown in FIG. 4, making up the majority of the frozen melt 68. This preferred microstructure of the frozen melt 68 can be achieved either by controlling the composition of the melt 68 as discussed above, or by limiting the maximum melt temperature, or by otherwise controlling the heating process, to produce large grains 70.

One suitable system for forming such a frozen melt is magnesium and nickel. The magnesium and nickel are heated to a temperature at which the material forms a magnesium-nickel solution. Preferably, the mixture is heated to about 650° C., and more preferably to about 800° C. The solution is then cooled to form a frozen melt.

In concentrations of less than about 11.3 atomic percent nickel, as the melt cools, magnesium will precipitate out with trace amounts of nickel, raising the nickel concentration of the remaining liquid. At about 11.3 atomic percent nickel, further cooling results in a eutectic of magnesium crystallites and $Mg_2Ni$ crystallites. For this system, the grains shown in FIG. 5 would be magnesium, with some trace amounts of nickel, and the matrix would be $Mg_2Ni$ and magnesium crystallites, the magnesium crystallites also containing trace amounts of nickel. The size of the grains would depend on the amount of magnesium present in the original melt and the cooling conditions.

Other cathode materials that are preferred for forming a frozen melt with magnesium include iron, copper, and cobalt, although gold, silver, palladium, or platinum may also be used. Of course other anode materials besides magnesium may be used. Any combination of metallic agent that can be melted together, or physically mixed together while melted, may be used, though some systems that do not form solutions may be hard to work with. It is not necessary for the system to form a eutectic. Also, it is preferable to use melts that are predominantly the metallic agent which will serve as the anode in the electrochemical interaction, such as magnesium in the magnesium-nickel system, since the cathode is not consumed. A preferred frozen melt can be made from about 80% to about 99.5% magnesium and about 20% to about 0.5% nickel. More preferably, the nickel will comprise about 5% or less of the frozen melt. Most preferred is a frozen melt comprising about 96% magnesium and about 4% nickel, resulting in a solid comprising about 83% magnesium grains and about 17% of a eutectic of $MgNi_2$ and magnesium crystallites.

The frozen melt is preferably formed into small particles to increase the surface area. FIG. 6 shows two preferred methods for forming small particles and the heat cartridge. The metallic agents are first melted to form a liquid melt. In the case of magnesium-nickel melts, the melt temperature is about 800° C. The melt can then either be cast into ingots and milled to produce small particles, or the molten alloy may be atomized, with individual droplets cooling to form the frozen melt 68 represented by FIG. 4. The atomizing step can be performed by a variety of standard metallurgical processes for forming small spherical particles from a molten melt. In the preferred large scale process, the magnesium alloy is sprayed into an inert atmosphere (argon) in a large vessel which permits the droplets to freeze before contacting the side of the vessel. The size of the particles can be controlled by atomization conditions. A second process, know as rotating electrode powder preparation, is a smaller scale process suitable for laboratory production of powder. In this process, an electrode is fabricated from the desired alloy and the electrode is placed in a rotating chuck within an enclosed chamber. The chamber is purged with argon and evacuated by mechanical pumping. Electrical sparks are generated between the electrode and an electrical ground. The sparks melt the alloy at a local point and the droplet of molten metal is spun from the surface by centrifugal force. The droplet cools during its trajectory and is collected. The preferred particle size of the frozen melt particles is in the range of 50-400 microns, most preferably 100-300 microns.

FIG. 7 shows yet another embodiment of the metallic agents that may be used to fill the heat cartridge. In this embodiment, small particles of a "mechanical alloy" 74 are prepared by mechanically bonding or cold welding together small particles of the separate metallic agent. Preferably, the area of contact of the metallic agents is very high. The metallic agent that will serve as the anode is the most predominant in particles and forms the background 76 of the particle. The metallic agent that will serve as the cathode is present as distinct specks 78 in the background 76.

Preferably, the anode material 76 is magnesium and the cathode specks 78 comprise iron. This type of material can be purchased from Dymatron Inc., 4329 Redbank Road, Cincinnati, Ohio 45227. The powder is reportedly made by ball-milling coarse magnesium powder with very fine iron powder in a vibrating mill. The powder blend used is 10% iron and 90% magnesium. Steel balls (0.25-inch diameter) are added to the powder blend, and the blend and the balls are reportedly vibrated for a period of about 15 minutes. U.S. Pat. Nos. 4,017,414 and 4,264,362 disclose processes for making such magnesium-iron mechanical alloys.

Preferably the mechanical alloy is screened to obtain desired particle sizes before it is used in the present invention. It has been found that in materials procured from Dymatron, Inc., only about half of the iron powder is embedded in the surface of the magnesium, the rest remains as fine iron powder. The powder as received from Dymatron also has a very broad particle size distribution. The alloy powder is preferably sized on a standard screener using screen sizes of 16, 30, 40, 50, 80, and 140 U.S. mesh. The portion that passes through the 50 U.S. mesh screen and stays on the 80 U.S. mesh screen is generally used, as it produces heat cartridges with the longest life at temperatures above 100° C. If a faster heating rate is desired, 10 or 20% of the total powder used may be a finer cut of powder (through 80 U.S. mesh screen, on the 140 U.S. mesh screen). The iron content of these cut powders are generally 6-7%. The unbound iron passes through the 140 U.S. mesh screen and is collected on the pan and discarded.

After particles of the proper size of either the frozen melt or the mechanical alloy are obtained, they may be used to fill the heat cartridge. In the most preferred embodiment the heat cartridge is filled with alloy in the powder form. Another method of filling the heat cartridge is to pressure form the particles of frozen melt, such as extruding them with a binder, into a desired shape. The shape may be a rod, which is then severed into the proper length to fill the heat cartridge. Cylindrical, square, annular and even star-shaped extrusions may be formed. Wider extrusions can also be made which may then be divided longitudinally into heat cartridges.

A binder such as sodium carboxymethyl cellulose (CMC) may be used to extrude the metallic agents. A level of about 6% binder in the extrudate has been found to hold the metallic agents into the proper shape. Extrusion is complicated by the fact that water typically used in extruding powders will initiate the electrochemical interaction of the heat cartridge particles. A preferred extrusion process uses low amounts of deionized water, and several other precautions to limit this problem. First, all of the ingredients and equipment are preferably cooled prior to the extrusion process. Second, it has been found that a small amount of heptane may be used to coat the powder particles prior to mixing the powder with CMC and water for the extrusion. Third, the extruder parts are preferably made of brass to reduce the possibility of sparking, and the equipment should be grounded.

Preferably the CMC is first mixed with deionized water to form a gel. A preferred ratio is 12 parts water to 1 part CMC. The powder/heptane ratio is preferably 20:1. The CMC gel and treated powder are preferably chilled before mixing. A Sigma blade mixer built to allow cooling with a liquid during mixing, such as the small Sigma blade mixer sold by C. W. Braybender Instruments Company, South Hackensack, N.J., has been found to give good results. The treated powder is preferably added to the pre-chilled (about 4° C.) mixer first and the CMC gel is slowly added and worked into the powder, using a slow blade speed, preferably about 8 RPM. The temperature should be monitored during the mixing, which may take up to an hour or more. Normally the temperature will rise a few degrees. If the temperature increases 15-20° C., the product should be emptied from the mixer, since the temperature rise indicates an excessive reaction is taking place and the mix will not be usable, and continued mixing may be dangerous.

The extruder should also be prechilled, and the mixed material charged to the extruder with a minimum of handling. The forming die will vary depending on the size of the heat cartridge being made. The extruder may be as simple as a tube and plunger. For example, a FORNEY compression tester has been used to supply extrusion pressure for a ram in a one inch diameter tube.

Preferably the die will be pointing down so that the extrudate can be caught on a plastic sheet taped onto a conveyor belt and removed in a horizontal position. The belt speed and extrusion speed should be controlled to obtain good results. Pressure in the extruder will preferably be increased in small increments, as over pressurizing may cause separation of the powder and CMC gel. A ram speed of about 0.3 to 0.5 inches per minute, with a load of about 70 pounds, has been found useful for an extrusion tube having an inside diameter of one inch.

After the extrudate is extruded out on the conveyor belt, it should be allowed to partially dry before it is handled. After about 30 minutes of drying, the extrudate can be cut into strips about 24 inches long and put onto drying racks.

The strips should be allowed to dry at room temperature overnight, and may be cut to size the following morning. The cut rods may then be heated to 60° C. in a vacuum oven (preferably explosion-proof) overnight to remove the heptane. The dried rods are then ready for making the heat cartridge.

The metallic agents may also be pressed into desired shapes. Two methods of pressing are contemplated plated, die pressing and isostatic pressing. Die pressing magnesium-based heat cartridge particles is difficult because of the tendency of magnesium to smear and reduce the porosity of the surface of the rod. To make a successful rod it is preferable to press the rod in a horizontal position. The die should be designed to release the part without any stripping action, which causes galling. The length and depth may be varied as necessary to produce a part of a desired weight and thickness. However, difficulties in filling such a long narrow cavity uniformly have been found to produce variable densities within the rod. It is believed that isostatic pressing would produce parts of uniform density without galling and with uniform density.

The material may need to have a binder or extender added to produce a heat cartridge with a proper rate of reaction. Also, the porosity (or void fraction) and pore size may be varied to help control the rate of reaction. Polysulfone, a high temperature plastic from Amoco, and CMC are possible binders. Magnesium and aluminum may be used as extenders. The porosity is primarily controlled by the pressure used. The pore size is primarily controlled by the particle size of the alloy powder.

An additional extender is NaCl. The NaCl may be used to provide porosity, as it will dissolve to form an electrolyte when the pressed rod is contacted by water. However, frozen melts or alloys produced with NaCl may be hygroscopic, and may therefore need to be stored in controlled humidity environments.

A preferred material for making pressed rods comprises an intimate mixture of about 48% magnesium (−325 mesh), about 32% of a −30 U.S. mesh, +40 U.S. mesh cut of mechanically bonded magnesium and iron from Dymatron, Inc., and about 20% NaCl ground to a small particle size. A preferred pressure for pressing such a mixture is 14,800 psi. The pressed rods can then be used to make the heat cartridge.

FIG. 8 illustrates another configuration of metallic agents formed into a bimetallic foil 80. The bimetallic foil 80 is formed with the metallic agent that will be corroded (the anode) forming a first or primary layer 82. A second metallic agent (the cathode) is applied in a thin film to the first layer to form a second layer 84. This thin, second layer 84 may preferably be formed by sputter coating. A preferred bimetallic foil 80 comprises a magnesium primary layer 82 about 4 mils thick, and a sputter coated iron second layer 84 about 0.1 micron thick. The bond between the first and second layers 82 and 84 can be formed in a variety of ways, so long as the first and second layers 82 and 84 are in electrical contact with one another.

The bimetallic foil 80 may be fitted into the heat cartridge 28 in several ways. A preferred method is to roll the foil into a roll 86. See FIG. 9. Alternatively, the foil 80 can be chopped into fine shreds 88 and either extruded with a binder, pressed into a rod 90 or just used to fill a tube 92, just as with the particles of frozen melt or mechanical alloy discussed above. See FIG. 10.

Yet another possible configuration of the metallic agents used to fill the heat cartridge is depicted in FIG. 11. In this embodiment, the anode material is formed into strands 94 and the cathode material is formed into a fine wire 96. The wire 96 can then be wrapped around the strands 94 to put the wire 96 in close proximity to the strands 94. In this embodiment, the wire 96 should preferably be in electrical contact with strands 94. Since the strands 94 will corrode during the electrochemical interaction, it is preferable to protect at least one area of the electrical contact from interaction so that the electrical contact is not lost. One simple method to do this is to crimp the wire and strands together at one end and coat the crimped end with a protective coating material impervious to the electrolyte used in the electrochemical interactions. The diameter of the strands 94 is important to obtain a sufficient surface area. In this embodiment, the strands 94 are preferably magnesium and the wire 96 is preferably iron. When magnesium is used to form the strands 94, each strand 94 is preferably 0.2 inches in diameter. The wire 96 need only be thick enough to provide physical integrity, since the wire 96 does not corrode. However, the surface area of the strands 94 and wire 96 are preferably approximately equal. In the preferred embodiment of FIG. 11, the iron wire 96 is 0.001 inch in diameter. The embodiment of FIG. 11 may preferably be constructed by twisting the strands 94 together before wrapping them with wire 96. The assembly of wires can then be used to construct the heat cartridge.

Normally, each heat cartridge 28 comprises about 100 mg to about 400 mg of metallic agents 54. For heat cartridges 28 which include a mixture of magnesium and iron, the amount of magnesium relative to iron within each heat cartridge ranges from about 100:1 to about 4:1, most preferably 50:1 to 16:1. Other metallic agents 54 would use similar ratios.

Referring again to FIGS. 1 and 2, once the metallic agents 54 have been inserted into the tube housing 52, the open end 60 of the tube housing 52 is then folded, leaving an aperture 62 in the bottom of the cartridge 28. The aperture 62 can be located at the center or near the periphery of folded end 60 of the tube 52. This aperture 62 facilitates mixing of the metallic agents 54 with the activating solution 30 when the heat source 20 is activated. The outer diameter 64 of the heat cartridge 28 is selected such that it closely fits inside the heat chamber 22, which has an inside diameter 66 just slightly larger. The heat cartridge 28 is positioned such that the aperture 62 faces the activating solution 30.

As previously discussed, activating solution 30 is enclosed between the frangible seal 32 and the closed end 26 of the heat chamber 22. The frangible seal 32 is preferably made of wax or a thin polymeric film. Strong electrolytes are preferred to serve as the active ingredient in the activating solution 30. Examples of preferred electrolytes include potassium chloride, sodium chloride, and calcium chloride. The electrolyte can be provided in a dry state with the metallic agents 54 and formed into the heat cartridge 28, or can preferably be supplied as a saline solution to initiate the electrochemical interaction. When the electrolyte is mixed with the metallic agents 54, each heat cartridge 28 will normally comprise about 5 mg to about 150 mg of electrolytes. Alternatively, when the electrolyte is provided with water in a saline solution, the electrolyte will preferably be dissolved at a level of about 1% to about 20% of the solution. The range of concentrations that would be acceptable for the activating solution varies based on the materials used and the type of reaction desired.

A solvent for the electrolyte may be employed to dissociate the electrolyte if the electrolyte is present in the heat cartridge, and hence initiate the electrochemical interaction between the metallic agents. The preferred solvent is water. The pH of the water can vary, but typically is about 6 or less. Contact of water with the components of the heat cartridge can be achieved in a variety of ways. For example, the heat cartridge 28 can be present in a heat chamber 22 in a dry state. Liquid water can be contained in a container inside the heat chamber 22 but separate from the heat cartridge 28, separated from the heat cartridge 28 by the frangible seal 32.

The heat source 20 shown in FIG. 3 is essentially like FIG. 1, and identical parts are numbered identically. The main difference is that the heat source 20 of FIG. 3 is shown in a post-activation position. In order to activate the metallic agents 54, and produce heat, the metallic agents 54 are combined with an activating solution 30. This is desirably achieved by pushing the heat cartridge through the frangible seal 32, towards the bottom of the heat chamber 22 with the help of a push rod (not shown). The stopper means 34 prevents the downward movement of the heat cartridge 28 past a certain distance D towards the closed end 26 of the heat chamber 22. The portion of the activating solution 30 located above the stopper 34 reacts instantaneously with the metallic agents 54 within heat cartridge 28.

The aperture 62 at the bottom of the heat cartridge 28 allows the activating solution 30 to flow in the heat cartridge 28 and react with the metallic agent 54. The size and placement of the aperture 62 is selected for controlling the rate of flow and hence the rate of reaction. The size of the aperture in the bottom of the heat cartridge may vary depending on the material used to make the cartridge, the reacting material and the activating solution used, and material used to hold the metallic agents in the heat cartridge.

Activating solution 30 also enters the heat cartridge 28 through the porous tube housing 52 of the heat cartridge 28. See FIG. 2. The solution is absorbed by the absorbent tube 52 and tissue covering 58 to quickly wick the activating solution 30 throughout the volume of the metallic agents 54. The porosity of the paper forming the heat cartridge can be varied between very low porosity and very high porosity. Normally, each heat cartridge 28 is contacted with about 0.5 ml to about 1.0 ml water, most preferably about 0.7 ml. However, both porosity of the paper and size of the aperture control the rate of initiation and the rate of reaction.

Upon absorbing the solution into the metallic agents 54, the cartridge 28 expands to create an air-tight fit against the interior walls of the heat chamber 22. The tight fit maintains a seal which allows the pressure in the closed end 26 of the heat chamber 22 to increase due to gaseous by-products released during the exothermic electrochemical reaction of the metallic agents 54 with the activating solution 30. The increased pressure drives more activating solution 30 into the interior of the heat cartridge 28 providing higher temperatures for a sustained period.

Many exothermic reactions like the electrochemical reaction described herein are water-based. The lack of water in such a reaction mixture will result in the immediate termination of the reaction. Consequently, the production of heat will stop. At temperatures of 100° C. and above, the rate of evaporative loss of water is significant. The arrangement of the heat source in accordance with the present invention allows the replacement of water in the reaction mixture in a sustained manner.

In addition to the above embodiments, the activating solution 30 may include a boiling modifier such as glycerin to prevent the water from vaporizing at temperatures experienced by the heat cartridge. Other boiling modifiers include triethylene glycol and 1-3-propane diol. Also, the outerwrap 40 of the heat cartridge 28 may act as a surface on which steam generated by the electrochemical interaction can condense and is thus cycled back into the reaction. See FIG. 12.

Desirable heat cartridges 28 or solutions applied thereto may include an oxidizing agent, such as calcium nitrate, sodium nitrate or sodium nitrite. For example, for preferred heat cartridges 28 containing magnesium, hydrogen gas, which results upon the hydroxylation of magnesium, can be exothermically oxidized by a suitable oxidizing agent. Normally, each heat cartridge or solution applied thereto comprises up to about 150 mg oxidizing agent. The oxidizing agent can be encapsulated within a polymeric material (e.g., microencapsulated using known techniques) in order to minimize contact thereof with the metallic agents (e.g., magnesium) until the desired time. For example, encapsulated oxidizing agent can increase the shelf life of the heat cartridge 28; and the form of the encapsulating material then is altered to release the oxidizing agent upon experiencing heat during use of the heat cartridge 28.

Unless the particles of metallic agents by their size and shape provide physical spacing, the heat cartridge preferably includes a dispersing agent to provide a physical spacing of the metallic agents. Preferred dispersing agents are essentially inert with respect to the electrolyte and the metallic agents. Preferably, the dispersing agent has a normally solid form in order to (i) maintain the metallic agents in a spaced apart relationship, and (ii) act as a reservoir for the electrolyte solution. Even where a dispersing agent is not needed for spacing, it may be used as a water retention aid.

Examples of normally solid dispersing agents or water retention aids are porous materials including inorganic materials such as granular alumina and silica; celite; carbonaceous materials such as finely ground graphite, activated carbons and powdered charcoal; organic materials such as wood pulp and other cellulosic materials; and the like. Generally, the normally solid dispersing agent ranges from a fine powder to a coarse grain or fibrous size. The particle size of the dispersing agent can affect the rate of interaction of the heat generating components, and therefore the temperature and longevity of the interaction. Although less preferred, crystalline compounds having chemically bound water molecules can be employed as dispersing agents to provide a source of water for heat generation. Examples of such compounds include potassium aluminum dodecahydrate, cupric sulfate pentahydrate, and the like.

The electrolyte or heat cartridge preferably includes an acid. The acid provides hydrogen ions, which are capable of enhancing the rate of the electrochemical reaction. Also, the acid is used to maintain the pH of the system below the point where the oxidizing anode reaction is impeded. For example, when the anode comprises magnesium, the system will become more basic as the reaction proceeds. However, at a pH of about 11.5, the $Mg(OH)_2$ forms a passive coating preventing further contact between the electrolyte solution and unreacted magnesium. The acid may be present in the form of a solution with the electrolyte, provided on a solid support, or mixed with the electrolyte solution to form a slurry. The solid and slurry may be preferable as the acid may then dissolve over time and provide a constant stream of hydrogen ions. The acid may preferably be malic acid. Other acids, such as citric and lactic acid may also be used. The acid chosen should not react with the electrolyte. Also, the acid should not be toxic, or produce unpleasant fumes or odors. Also, the acid may have an effect on the overall reaction rate, and should thus be chosen accordingly.

Although not preferred, the heat cartridge or the solution applied thereto may also include a phase change or heat exchanging material. Examples of such materials are sugars such as dextrose, sucrose, and the like, which change from a solid to a liquid and back again within the temperature range achieved by the heat cartridge during use. Other phase change agents include selected waxes or mixtures of waxes. Such materials absorb heat as the interactant components interact exothermically so that the maximum temperature exhibited by the heat cartridge is controlled. In particular, the sugars undergo a phase change from solid to liquid upon application of heat thereto, and heat is absorbed.

However, after the exothermic chemical interaction of the interactive components is nearly complete and the generation of heat thereby decreases, the heat absorbed by the phase change material can be released (i.e., the phase change material changes from a liquid to a solid) thereby extending the useful life of the heat cartridge. Phase change materials such as waxes, which have a viscous liquid form when heated, can act as dispersing agents also. About 150 mg of phase change material may be used with each heat cartridge.

The present invention is directed not only to heat sources, as described above, but also to smoking articles containing such heat sources. For example, in a preferred embodiment, the cigarette 36 of FIG. 12 incorporates the heat source 20 of FIG. 1 to provide a non-combustible smoking experience. One embodiment of the present invention includes a cigarette 36 having an elongated, essentially cylindrical rod shape. The cigarette includes a roll or charge of tobacco 38 wrapped in a generally tubular outer wrap 40 such as cigarette paper, thereby forming a tobacco rod 41. An example of a suitable outer wrap 40 is calcium carbonate and flax fiber cigarette paper available as Reference No. 719 from Kimberly-Clark Corp.

The roll of tobacco 38 may be a blend of tobaccos in cut filler form as shown (FIG. 14), or may be in the form of rolled tobacco sheet. For example, the tobacco can be employed as strands or shreds of tobacco laminae, reconstituted tobacco, volume expanded tobacco, processed tobacco stems, or blends thereof. Extruded tobacco materials and other forms of tobacco, such as tobacco extracts, tobacco dust, or the like, also can be employed as portions of a tobacco blend. Tobacco extracts include tobacco essences, tobacco aroma oils, spray dried tobacco extracts, freeze dried extracts, and the like. When tobacco extracts are employed, such extracts normally are carried by a substrate such as alumina, a carbonaceous material, a cellulosic material, or by tobacco material such as reconstituted tobacco material or tobacco laminae. Processed tobaccos, such as tobaccos treated with sodium bicarbonate or potassium carbonate, which readily release the flavorful components thereof upon the application of heat thereto, are particularly desirable. Normally, the weight of the tobacco within the cigarette ranges from about 0.2 g to about 1 g. Suitable cigarette and smokable filler material for use in smoking articles can be found in U.S. Pat. No. 5,598,868 to Jakob et al.

In addition, the preferred tobacco may be cased and top dressed with flavoring agents such as menthol, vanillin, cocoa, licorice, cinnamic aldehyde, and the like; as well as tobacco flavor modifiers such as levulinic acid. Such flavoring agents can be carried by the tobacco or positioned elsewhere within the smoking article (e.g., on a separate substrate located in a heat exchange relationship with the heat source, or within the filter). If desired, substances which vaporize and yield visible aerosols can be incorporated into the smoking article in a heat exchange relationship with the heat source.

Within the tobacco rod 41 is positioned the heat source 20 of FIG. 1. The open end 24 of the heat chamber 22 is near the air inlet region 42 of the cigarette 36, and the closed end 26 toward the mouth end or filter-tip end 46 of the tobacco rod 41. The resulting tobacco rod 41 has the heat source 20 embedded therein, such that the tobacco 38 and heat source 20 are physically separate from one another. By "physically separate" it is meant that the tobacco used for providing flavor is not mixed with, or is not a part of, the heat source. The tobacco rod 41 has a length L1 which can vary, but generally has a length of about 5 mm to about 90 mm, preferably about 40 mm to about 80 mm, and more preferably about 55 mm to about 75 mm; and a circumference of about 22 mm to about 30 mm, preferably about 24 mm to about 27 mm.

The cigarette 36 of FIG. 12 also includes a filter element 48 that is axially aligned with, and positioned in an end-to-end relationship with the tobacco rod 41. Since there are no combustion products, the filter element 48 is not required but may perform primarily as a mouth piece so that users will experience a familiar sensation holding the cigarette in their lips as with conventional cigarettes. The filter element 48 may be a cellulose acetate tube or may include a filter material, such as a gathered or pleated polypropylene web, or the like, and an outer wrapper, such as a paper plug wrap. Highly preferred filter elements exhibit no, or relatively low, filtration efficiencies.

The filter made of a gathered web or polymer sheet has a low filtering efficiency. The polymer sheet may or may not include other polymers, fillers, pH modifiers and/or be pre-perforated before forming into filter plugs on standard filter making equipment modified to form gathered web filters. An example of suitable filler material can be found in U.S. Pat. No. 5,598,868 to Jakob et al. In some applications, a web of porous non-woven polypropylene or other polymer(s) might be used to form a low efficiency filter plug. In some applications the web may be coated before or during the gathering process to adjust pH or to add flavor(s) to balance the taste of the aerosol. In other applications a filter plug may be made from extruded multi-lumen polymeric material with or without filler(s) and/or flavor(s) and/or tobacco extracts. An extruded multi-lumen plug may be co-extruded with an impervious outer layer to keep flavors from migrating to the outer wall surface.

Normally, the circumference of the filter element 48 is similar to that of the tobacco rod 41, and the length $L_2$ of the filter 48 ranges from about 10 mm to about 35 mm. Representative filter elements 48 can be provided as described in U.S. Pat. No. 4,807,809 to Pryor et al. and U.S. Pat. No. 5,360,023 to Blakley et al. The filter element 48 and tobacco rod 41 are held together using tipping paper 50. Normally, tipping paper 50 has adhesive applied to the inner surface thereof (not shown), and circumscribes the filter element 48 and an adjacent region of the tobacco rod 41.

Referring now to FIG. 14, in another embodiment, the open end of the heat chamber 22 is equipped with a collar 124 made of tightly rolled tobacco paper. The collar 124 is usually 7 mm long and tightly fits in the space between the heat chamber 22 and the tobacco rod 41. The collar 124 holds the heat chamber 22 in place. The end 42 of a cigarette with a collar 124 is impermeable to air and is therefore equipped with air-intake holes 136 (See FIG. 15) placed about 10 mm from the end of the cigarette.

The cigarette 36 could also be configured to have the tobacco 38 in the center and the heat source 20 surrounding it, as shown in FIGS. 2 and 2A of U.S. Pat. No. 4,938,236, to Banerjee et al., which is hereby incorporated by reference.

The cigarette 36 shown in FIG. 13 shows the heat chamber 28 in a post-activation position. This embodiment is essentially like the embodiment in FIG. 12, and identical parts are numbered identically.

The cigarette 36 shown in FIG. 14 shows how the heat cartridge 28 fits into heat chamber 22. It is an exploded view of FIG. 12, and identical parts are numbered identically.

Generally, desirable heat sources of the present invention generate heat in the desired amount and at the desired rate as a result of one or more chemical interactions between components thereof, and not as a result of combustion of components of the heat source. As used herein, the term "combustion" relates to the oxidation of a substance to yield heat and oxides of carbon. See, Baker, Prog. Ener. Combust. Sci., Vol. 7, pp. 135-153 (1981). In addition, preferred non-combustion heat sources of the present invention generate heat without the necessity of the presence of any gaseous or environmental oxygen (i.e., in the absence of atmospheric oxygen).

Desirable heat sources generate heat rapidly upon initiation of the chemical interaction of the components thereof. As such, heat is generated to warm tobacco to a degree sufficient to volatilize an appropriate amount of flavorful components of the tobacco rapidly after the smoker has initiated use of the cigarette. Rapid heat generation also assures that sufficient volatilized tobacco flavor is provided during the early puffs. Typically, heat sources of the present invention include sufficient amounts of components which interact to heat at least a portion of the tobacco to a temperature in excess of 90° C., more preferably in excess of 120° C. within about 60 seconds, more preferably within about 30 seconds; from the time that the smoker has initiated use of the cigarette.

Desirable heat sources generate heat so that the tobacco is heated to within a desired temperature range during the useful life of the cigarette. For example, although it is desirable for the heat source to heat at least a portion of the tobacco to a temperature in excess of 90° C. very rapidly when use of the cigarette is initiated, it is also desirable that the tobacco experience a temperature of less than about 250° C., preferably less than about 200° C., during the typical life of the cigarette. Thus, once the heat source achieves sufficient rapid heat generation to heat the tobacco to the desired minimum temperature, the heat source then generates heat sufficient to maintain the tobacco within a relatively narrow and well controlled temperature range for the remainder of the heat generation period. This temperature range is preferably maintained for at least 4 minutes, more preferably 8 minutes, and most preferably longer. Typical temperature ranges for the life of the cigarette are between about 100° C. and about 250° C., more preferably between about 105° C. and about 180° C., for most cigarettes using heat sources of the present invention. Control of the maximum temperature exhibited by the heat source is desired in order to avoid thermal degradation and/or excessive, premature volatilization of the flavorful components of the tobacco and added flavor components that may be carried by the tobacco.

Preferred smoking articles of the present invention have a long shelf life. That is, during distribution and storage incident to commercial products, neither the flavor nor the heat cartridge will lose their potency over time. Finally, when the product is ready for use, the smoker initiates exothermic interaction of the heat cartridge and the heat cartridge generates heat. The heat which results acts to warm the tobacco, positioned in close proximity to the heat cartridge, so as to be in a heat exchange relationship therewith. The heat so supplied to the tobacco acts to volatilize flavorful components of the tobacco as well as flavorful components carried by the tobacco. The volatilized materials then are drawn to the mouth-end region of the cigarette and into the smoker's mouth. As such, the smoker is provided with many of the flavors and other pleasures associated with cigarette smoking without burning any materials. The heat cartridge provides sufficient heat to volatilize flavorful components of the tobacco while maintaining the temperature of the tobacco within the desired temperature range. When heat generation is complete, the tobacco begins to cool and volatilization of flavorful components thereof decreases. The cigarette then is discarded or otherwise disposed of.

EXAMPLES

The following examples are provided in order to further illustrate various embodiments of the invention but should not be construed as limiting the scope thereof. Unless otherwise noted, all parts and percentages are by weight.

Example 1

A heat chamber is prepared as follows:

The heat chamber is made of a special grade of polypropylene, available from The Dow Chemical Company, which can withstand at least 200° C. The chamber is a 105 mm long polypropylene tube with an internal diameter of 4.72 mm. Extruded tubes of this dimension can be obtained from American Extruded Plastic, Greensboro, N.C. The tubes are cut to appropriate length and one end is heat-sealed using an electric hot plate. A 20 mm long Mylar® tube with an internal diameter of 4.72 mm is cut longitudinally in half. The longitudinally cut piece of Mylar® tube is placed at the closed end of the heat chamber. This serves as a stopper for the heat cartridge when it is pushed through a frangible seal.

Example 2

A heat cartridge is prepared as follows:

The heat cartridge is prepared from a tube made of porous plug wrap 0011417. Porous plug wrap 0011417 is supplied by Schweitzer, Mauduit International Inc., Alpharetta, Ga. (SWM), with 6650 Coresta Units (CU) porosity, 20.5 g/m$^2$ basis weight, and 0.0540 mm caliper. Plug wraps with lower porosity can be used, provided the porosity is increased to the described level by mechanical perforation. Alternative plug wraps include: 0016361 supplied by Miquel (MYC), which has a porosity of 1570 CU, basis weight 22 g/m2, and caliper of 0.0425 mm; 0011745 supplied by SWM, which has a porosity of 26,000 CU, basis weight of 22 g/m$^2$, and caliper of 0.0650 mm; 1001622 supplied by SWM, which has a porosity of 4375 CU, a basis weight of 22 g/m$^2$, and caliper of 0.0516 mm. All of these are available in 26.5 mm. width.

A rectangular piece of the plug wrap 0011417, 17 mm by 43 mm, is rolled into a tube with an internal diameter of 0.1465 inch (3.72 mm). The tube is held in shape with three spots of glue at the bottom, center and top. The paper tube is overwrapped with a 38 mm by 40 mm square of multi-purpose 20 lb paper, Hewlett Packard. The overwrap is held in place with glue stripes at the bottom, center, and top. The outer tube is folded and glued to form the closed end of the cartridge.

About 317 mg of metallic agent, Corrodalloy 5 from Dymatron, Inc., is covered with a 9 mm by 16 mm piece of single ply Kleenex® tissue and is placed inside the tube. The end of the tube is then folded leaving a 2 mm opening. The end of the cartridge with the opening forms the bottom of the heat cartridge. The outer diameter of the cartridge is such that it closely fits inside the heat chamber of Example 1.

Example 3

A heat cartridge is prepared as follows:

A rectangular piece of multipurpose 20 lb paper, Hewlett Packard, 26 mm by 40 mm, is rolled into a tube having an internal diameter of 0.1465 inch (3.72 mm). The paper is held in place with a thin glue line. About 4 mm length of the tube is folded and glued to form the closed end of the cartridge. About 350 mg of metallic agent, Corrodalloy 5 from Dymatron, Inc., is covered with a 10 mm by 12 mm piece of Kleenex® tissue and is placed inside the tube. The tube is then folded shut leaving a 2.5 mm opening. The end of the cartridge with the opening forms the bottom of the cartridge. The outer diameter of the cartridge is such that it closely fits inside the heat chamber of Example 1.

Example 4

An activating solution is prepared as follows:

40 g of potassium chloride and 80 g of potassium nitrate are dissolved in 340 g of deionized water. Then, 40 g of triethylene glycol is added to the solution. About 450 microliters of this solution is placed at the bottom of the heat chamber. The amount of solution used may vary between 100 and 1200 microliters.

Example 5

The preferred embodiment of a cigarette 100 of the present invention is shown in FIG. 15 and was constructed as follows.

The heat chamber 102 is made in accordance with Example 1, the heat cartridge 104 is made in accordance to Example 2, and the activating solution 108 is made in accordance with Example 4. This heat chamber 102 should be inspected after heat sealing to assure that the closed end 106 does not leak, which would interfere with its capacity and further assembly. The heat chamber 102 contains 0.45 ml of activating solution 108, sealed in the closed end 106 of the heat chamber 102 behind a wax seal 110. The wax seal 110 is applied using a syringe loaded with wax. A first layer about 0.01 inches thick is applied just above the liquid level in the tube 102. A second layer of the same thickness is applied about 6 mm above the activating solution 108. The heat cartridge 104 of Example 2 is held at the open end of the heat chamber 102 by friction fit.

Reconstituted tobacco sheets (P2831-189-AA-6215, Kimberly-Clark Corporation, Georgia) consisting of about 20.7% precipitated calcium carbonate, about 20% wood pulp and about 59.3% tobacco are cut into 60 mm by 70 mm segments and rolled into a 7 cm tube with an internal diameter of 0.208 inches. Various flavoring materials and humectants are applied to the tube and equilibrated overnight. Preferred flavoring materials may be found in U.S. Pat. No. 5,285,798 which is hereby incorporated by reference. Levulinic or other acids are applied to similar tobacco rods made with reconstituted sheets not containing calcium carbonate. The flavored tobacco tubes are cut into either 7 or 10 mm segments. Various segments from different tubes may then be used as segments 114-120 in the cigarette of the preferred embodiment. The segments 114-120 are placed on the heat chamber 102 containing the activating solution 108.

The heat chamber 102 and the flavored tobacco segments 114-120 are inserted into a Mylar® tube 122, 100 mm long with an outer diameter of 0.298". The Mylar® tube 122 surrounds the tobacco segments 114-120 and heat chamber 102 to form the first layer of the cigarette 100. Collars 124 are fabricated from reconstituted tobacco sheet (P831-189-AA5116, Kimberly-Clark Corporation, Ga.) by rolling a segment of 20.5 cm by 6 cm to form a tube with a 0.293 inch outer diameter, 0.208 inch internal diameter and 6.0 cm length. This tube is cut into 5 mm collars and held in place in the end of tube 122 with Elmer's glue.

The collar 124 at the end of the outer tube 122 serves to hold the heat chamber 102 in place. To the mouth end of the tube 122 is inserted a segment of COD filter 126, one end of which is cut at a 60 degree angle. The COD filter 126 is 13 mm long on the short side and has a passage hole 4.5 mm in diameter through the center.

The outer tube 122 is wrapped with a 0.006 inch thick polystyrene insulating material 128 (Astro Valcour Inc., N.Y.) 49×100 mm in dimension forming several layers, only one of which is shown. This is then overwrapped with cigarette paper 130 and tipping paper 132 (respectively P2831-77 and AR5704 from Kimberly-Clark Corporation, Ga.). Another example of suitable cigarette wrapping paper can be found in U.S. Pat. No. 5,220,930 to Gentry. The initiating end 134 of the cigarette 100 has a series of 5 air intake holes 136, equally spaced 72 degrees apart and 7 mm from the end, made with a 23 gauge B-D syringe needle. The collar 124 seals the front of the cigarette 100 so that air that flows past the tobacco segments 114-120 may only enter through holes 136. The small amount of steam or other gases created by the reaction pass out the initiating end 134 of the cigarette 100 and are thus diverted away from the air intake holes 136.

After assembly, the cigarette 100 is activated by using a push rod to push the heat cartridge 104 through the wax seal 110. The activating solution 108 will enter the heat cartridge 104 through the aperture 142 in the bottom of the heat cartridge 104 and be absorbed by the tissue-like paper 144 surrounding the metallic agents 148. The heat cartridge 104 is stopped from reaching the closed end 106 of the heat chamber 102 by the Mylar® stopper 150. The reaction starts at the interface of the metallic agents 148 and the activating solution 108. Upon reaction, the mechanical agents 148 expand and create a seal at the boundary of the liquid and solid phase. Parts of the gaseous by-products of the reaction diffuse into the liquid held in the compartment at the bottom of the heat chamber. This creates a high pressure zone. The high pressure forces the activating solution into the heat cartridge in a sustained manner. The duration of the reaction is extended and the heat chamber 102 attains a higher temperature. About 30 seconds after initiation, sufficient heat is generated so that taste and flavor components are delivered to the mouth of the smoker upon puffing. If it is desired that the cigarette generate an aroma when activated, a drop of tobacco or other flavor extract may be added to the end of the heat chamber 102. Under normal puffing conditions the cigarette 100 will deliver the flavor and taste components for at least 7 minutes. After this period the rate of delivery decreases.

Example 6

A similar cigarette may be made using the method described in Example 5 with the heat cartridge of Example 3. When the heat cartridge from Example 3 is used, 900 micro liters of activating solution will be used.

EXPERIMENTAL DATA

Figure 16:
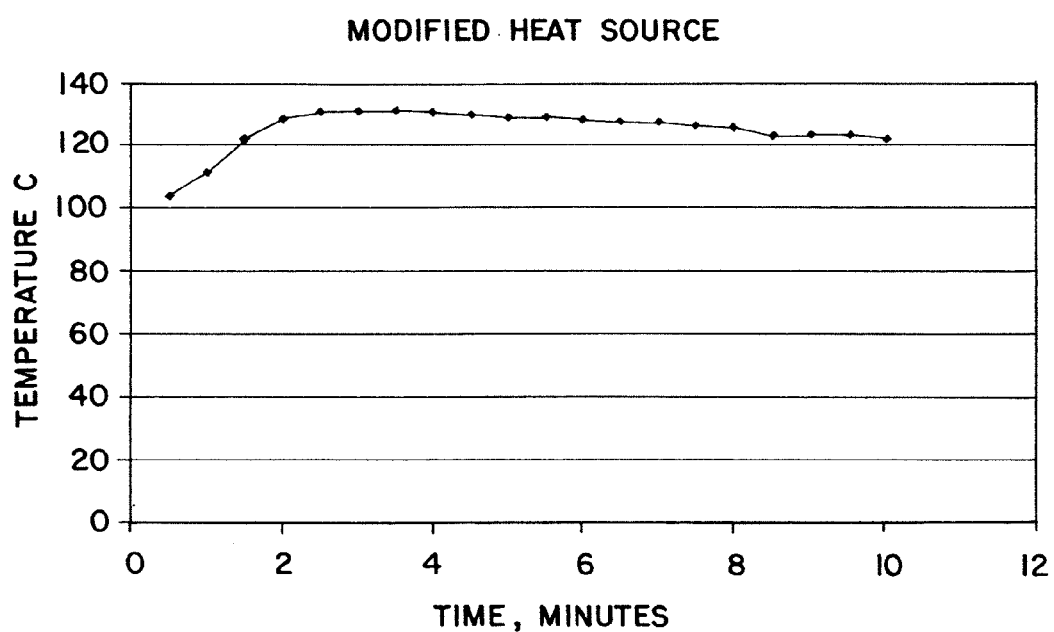
FIG. 16 is a graph representing the time/temperature test data for the cigarette of Example 5 with the heat cartridge of Example 2.
Figure 17:
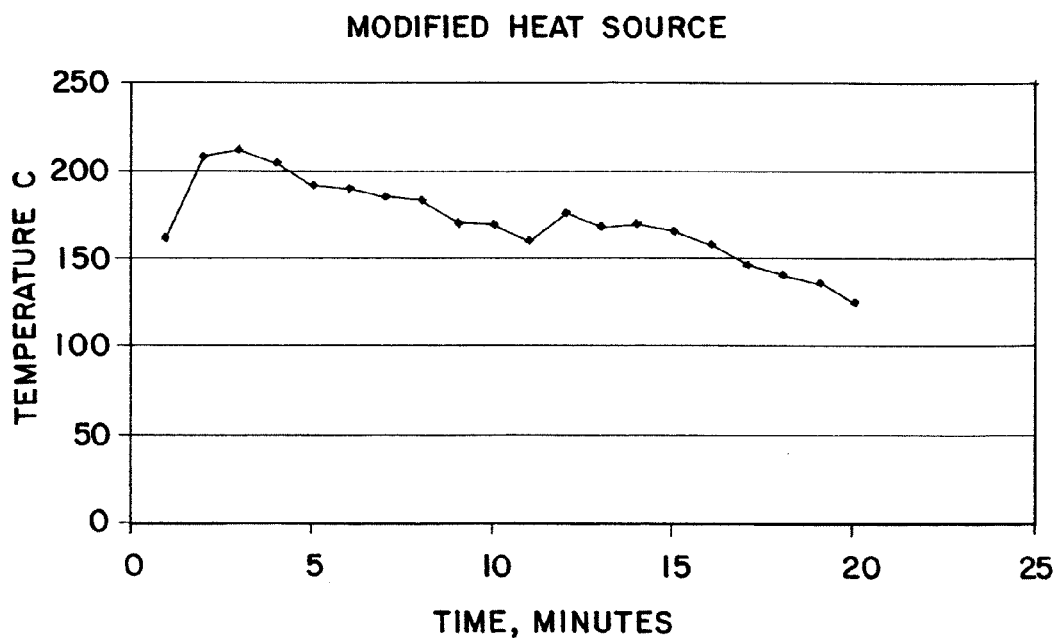
FIG. 17 is a graph representing the time/temperature test data for the cigarette of Example 5 with the heat cartridge of Example 3.

FIGS. 16 and 17 represent test data for the time/temperature curves for cigarettes made using the heat cartridges of Examples 2 and 3, respectively. The heat chamber was prepared as described in Example 1. The chamber contained 500 ml of activating solution at the bottom. The heat cartridge was prepared with 317 mg of metallic agent, Corrodalloy 5 from Dymatron, Inc. Full details for the preparation of the heat cartridge are described in Example 2. The heat chamber was insulated by wrapping it with a 2-ply Kleenex® tissue, 4"×8" in dimension. A thermocouple lead (Type J, available from Omega Engineering, Inc., Conn. USA) was placed inside the heat chamber about 4 cm from the bottom. The thermocouple was connected to a digital meter. The reaction was initiated by pushing the heat cartridge towards the bottom of the heat chamber. Temperatures were recorded every 30 seconds. The time-temperature curve is shown in FIG. 16. In less than one minute, the temperature reached above 100° C. The maximum temperature was 130° C. The temperature stayed above 120° C. for more than ten minutes.

In a subsequent experiment, the heat cartridge was prepared as described in Example 3. The experiment was conducted as described in the last example, except that about 800 microliters of activating solution was used. The time-temperature curve of this heat source is shown in FIG. 17. The temperature went up to about 220° C. and stayed above 150° C. for about 15 minutes.

The heat source of the present invention will find utility in heating food and beverages, and being used to form hand warmers. In fact, the heat source of the present invention may be used to provide heat in any of the uses discussed with regard to the prior art.

It should be appreciated that the structures and methods of the present invention are capable of being incorporated in the form of a variety of embodiments, only a few of which have been illustrated and described above. The invention may be embodied in other forms without departing from its spirit or essential characteristics. For example, even though the systems described herein use only two metallic agents, the heat cartridges may be made using more than two metallic agents that electrochemically interact. Thus, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A smoking article comprising:
   tobacco; and
   a chemical heat source comprising:
   a heat chamber having an open end, a closed end, and a length;
   an abutment having a length disposed at the closed end of the heat chamber;
   a heat cartridge disposed at the open end of the heat chamber having a closed end and an end including an aperture therein;
   a frangible partition disposed between the heat cartridge and the abutment; and
   an activating solution disposed between the frangible partition and the closed end of the heat chamber.

2. The smoking article of claim 1 wherein the heat source is activated by pushing the heat cartridge beyond the frangible partition to release the activating solution through the aperture of the heat cartridge.

3. The smoking article of claim 2, wherein the abutment prevents the heat cartridge from penetrating the closed end of the heat chamber.

4. The smoking article of claim 2 wherein the heat cartridge reaches a temperature of at least about 100° C. within one minute of activation and maintains a temperature of over 100° C. for at least about five minutes.

5. The smoking article of claim 1 wherein the frangible partition is disposed a distance from the closed end of the heat chamber wherein the distance is greater than the length of the abutment.

6. The smoking article of claim 5, wherein the abutment stops the heat cartridge at a distance, equal to the length of the abutment, from the closed end of the heat chamber when the heat cartridge is pushed past the frangible partition.

7. The smoking article of claim 1, wherein the length of the abutment is between about 15% to about 20% of the length of the heat chamber.

8. The smoking article of claim 1, wherein the abutment comprises a tube.

9. The smoking article of claim 1, wherein the abutment comprises a tube fragment.

10. The smoking article of claim 9, wherein the tube fragment is comprised of a polyester film.

11. The smoking article of claim 1, wherein the heat chamber is comprised of polypropylene and wherein the heat chamber can withstand temperatures of at least about 200° C.

12. The smoking article of claim 1, wherein the heat cartridge comprises a chemical compound capable of producing heat.

13. The smoking article of claim 12, wherein the chemical compound comprises a metallic alloy.

14. The smoking article of claim 13, wherein the metallic alloy comprises magnesium and iron.

15. The smoking article of claim 1, wherein the frangible partition comprises wax or polymeric film.

16. The smoking article of claim 1, wherein the activating solution comprises potassium chloride and potassium nitrate.

17. The smoking article of claim 1, wherein the heat chamber is surrounded by the tobacco.

18. The smoking article of claim 1, wherein the smoking article has two ends and further comprises a filter disposed at one end of the smoking article.

19. The smoking article of claim 1, wherein the tobacco is treated to reduce the volatilization temperature of the tobacco components.

20. The smoking article of claim 19, wherein the tobacco is in the form of a reconstituted tobacco sheet impregnated with a porous material.

21. The smoking article of claim 1, wherein the smoking article is a cigarette.

22. The smoking article of claim 1, wherein the smoking article is a cigar.

23. A smoking article comprising:
   tobacco comprising at least one volatile flavoring agent; and
   a chemical heat source comprising:
   a heat chamber having an open end, a closed end, and a length;
   a stopper having a length disposed at the closed end of the heat chamber;
   a heat cartridge disposed at the open end of the heat chamber having a closed end and an end including an aperture therein;
   a frangible partition disposed between the heat cartridge and the stopper; and
   an activating solution disposed between the frangible partition and the closed end of the heat chamber.

24. The smoking article of claim 23, wherein the at least one volatile flavoring agent surrounds the heat chamber.

25. A method of heating tobacco in a smoking article, comprising:
providing a heat chamber surrounded by tobacco and having a heat cartridge disposed therein;
pushing the heat cartridge toward a closed end of the heat chamber until the heat cartridge reaches a means for stopping the cartridge a distance from the closed end;
puncturing a frangible partition, positioned a distance from the closed end of the heat chamber, whereby an activating solution is released; and
contacting the activating solution with the heat cartridge.

26. The method of claim 25, wherein the heat cartridge comprises a metallic alloy.

27. The method of claim 25, wherein the heat cartridge comprises magnesium and iron.

28. The method of claim 25, wherein the activating solution comprises potassium chloride and potassium nitrate.

29. The method of claim 25, wherein the heat cartridge reaches a temperature of at least about 100° C. within one minute of contacting the activating solution.

30. The method of claim 29, wherein the heat cartridge maintains a temperature of at least about 100° C. for at least about five minutes.

31. The method of claim 25, wherein the frangible partition is punctured by the heat cartridge being pushed with a pushrod toward the closed end of the heat chamber.

32. A method of heating tobacco in a smoking article, comprising:
providing the smoking article of claim 1;
pushing the heat cartridge through the frangible partition, toward the closed end of the heat chamber;
contacting the activating solution with the heat cartridge.

33. The method of claim 32, wherein the heat cartridge comprises a metallic alloy.

34. The method of claim 32, wherein the heat cartridge comprises magnesium and iron.

35. The method of claim 32, wherein the activating solution comprises potassium chloride and potassium nitrate.

36. The method of claim 32, wherein the heat cartridge reaches a temperature of at least about 100° C. within one minute of initiating the reaction.

37. The method of claim 36, wherein the heat cartridge maintains a temperature of at least about 100° C. for at least about five minutes.

38. The method of claim 32, wherein the frangible partition is punctured by the heat cartridge being pushed with a pushrod toward the closed end of the heat chamber.

39. The method of claim 32, further comprising allowing the heat cartridge to expand after contact with the activating solution, thereby forming a seal between the heat cartridge and the heat chamber to allow pressure to increase in the closed end of the heat chamber, whereby the pressure forces activating solution into the heat cartridge thereby maintaining increased temperatures generated by the heat source.

* * * * *